United States Patent [19]
Ma et al.

[11] Patent Number: 5,519,085
[45] Date of Patent: *May 21, 1996

[54] AQUEOUS DISPERSIONS CONTAINING ABC TRIBLOCK POLYMER DISPERSANTS

[75] Inventors: Sheau-Hwa Ma, Chadds Ford, Pa.; Ira B. Dicker, Wilmington, Del.; Walter R. Hertler, Kennett Square, Pa.

[73] Assignee: E. I. Du Pont de Nemours and Company, Wilmington, Del.

[*] Notice: The term of this patent shall not extend beyond the expiration date of Pat. No.5,219,945.

[21] Appl. No.: 512,048

[22] Filed: Aug. 7, 1995

Related U.S. Application Data

[63] Continuation of Ser. No. 188,349, Jan. 28, 1994, abandoned, which is a continuation of Ser. No. 838,181, Feb. 20, 1992, abandoned.

[51] Int. Cl.$^6$ .................................................. C08N 29/04
[52] U.S. Cl. .................. 524/503; 106/20 D; 106/499; 524/376; 524/377; 524/379; 524/385; 524/386; 524/505; 524/555; 524/558
[58] Field of Search ................. 106/20 D, 499; 524/376, 377, 379, 385, 386, 503, 505, 555, 558

[56] References Cited

U.S. PATENT DOCUMENTS

| | | | |
|---|---|---|---|
| 3,547,870 | 8/1967 | Listner et al. | 260/32.6 |
| 3,891,721 | 6/1975 | Prudence | 260/879 |
| 4,137,083 | 1/1979 | Hedrick | 106/20 |
| 4,424,862 | 1/1981 | Handa et al. | 260/42.47 |
| 4,459,220 | 7/1984 | Bellos | 252/344 |
| 4,464,203 | 8/1984 | Belde et al. | 106/308 N |
| 4,721,739 | 1/1988 | Brenneman et al. | 523/161 |
| 4,891,167 | 1/1990 | Clendinning et al. | 560/52 |
| 4,970,251 | 10/1990 | Hsieh | 524/159 |
| 5,085,698 | 2/1992 | Ma et al. | 106/20 |
| 5,096,973 | 3/1992 | Herrmann et al. | 525/314 |
| 5,120,765 | 6/1992 | Southwick et al. | 524/505 |
| 5,129,948 | 7/1992 | Breton et al. | 106/22 |

FOREIGN PATENT DOCUMENTS

| | | |
|---|---|---|
| 0408429A1 | 1/1991 | European Pat. Off. . |
| 20193274 | 4/1990 | Japan . |
| 9000514 | 7/1990 | WIPO . |

OTHER PUBLICATIONS

Riess, G., et al., "New Morphologies in Rubber–Modified Polymers," *J.Macromol.Sci.—Phys.*, B17(2), 355–374 (1980).

Fielding–Russell, G. S., et al., "Some Optical and Mechanical Properties of an ABC Triblock Copolymer, Styrene/Butadiene/2–vinylpyridine, and its Hydrochloride Sale," *Polymer*, vol. 18, Aug. 1977, pp. 859–861.

*Primary Examiner*—Judy M. Reddick

[57] ABSTRACT

Aqueous dispersions having improved stability and which are particularly well suited for use as aqueous ink jet ink compositions comprise an aqueous carrier medium which comprises water or a mixture of water and at least one organic component; a particulate solid, preferably a pigment; and an ABC triblock polymer comprising an A block which is a hydrophilic polymer, a B block which is a polymer capable of binding to the particulate solid, a C block, different from the A and B block, which is a hydrophobic or hydrophilic polymer; and wherein the A and C blocks are end blocks.

27 Claims, No Drawings

AQUEOUS DISPERSIONS CONTAINING ABC TRIBLOCK POLYMER DISPERSANTS

This is a continuation, of application Ser. No. 08/188,349 filed Jan. 28, 1994, now abandoned.

FIELD OF THE INVENTION

This invention relates to dispersions having improved stability, and, more particularly, to aqueous pigmented inks for ink jet printers having improved stability wherein the pigment dispersant is an ABC triblock polymer.

BACKGROUND OF THE INVENTION

Ink jet printing is a non-impact printing process in which a digital signal produces droplets of ink on media substrates such as paper or transparency films. In thermal ink jet printing, resistive heating is used to vaporize the ink, which is expelled through an orifice in the ink jet printhead toward the substrate. This process is known as firing, in which water is vaporized by the heat, causing a very rapid and drastic local compositional change and temperature rise. This occurs repeatedly at high frequency during the life of the printhead. In the orifice areas, the ink composition can drastically change from water-rich to solvent-rich as well due to evaporation of water. This may cause the pigment particles to flocculate around the orifice in the printhead, eventually leading to plugging of the orifice in the printer mechanism from which droplets of ink are expelled. This will lead to misdirection of the ink drop or prevention of drop ejection.

In the conventional coating applications, many additives of organic nature are used to impart the desired physical properties for the final use. Examples include polymer binders, thickeners, thixotropic agents, coating aids, etc. During the drying process, these components are concentrated. The pigment dispersion needs to accommodate such changes in order to maintain the uniformity and color quality for the final coatings.

Aqueous pigment dispersions are well known and have been used commercially in films such as paints on substrates. A pigment dispersion is generally stabilized by either a non-ionic or ionic technique. In the non-ionic technique, the pigment particles are stabilized by a polymer that has a water-soluble, hydrophilic section that extends into the water and provides entropic or steric stabilization. Representative polymers useful for this purpose include polyvinyl alcohol, cellulosics, and ethylene oxide modified phenols. While the non-ionic technique is not sensitive to pH changes or ionic contamination, it has a major disadvantage for many applications in that the final product is water sensitive. Thus, if used in ink applications or the like, the pigment will tend to smear upon exposure to moisture.

In the ionic technique, the pigment particles are stabilized by a polymer of an ion containing monomer, such as neutralized acrylic, maleic, or vinyl sulfonic acid. The polymer provides stabilization through a charged double layer mechanism whereby ionic repulsion hinders the particles from flocculation. Since the neutralizing component tends to evaporate after application, the polymer then has reduced water solubility and the final product is not water sensitive. Ideally, a polymer dispersant which could provide both steric and charged double layer stabilization forces would make a much more robust pigment dispersion.

Polymer dispersants having both random and block structures have been disclosed. For example, U.S. Pat. No. 4,597,794 proposes an aqueous ink dispersion for ink jet printers in which the pigment is contained in a polymer having ionic hydrophilic segments and aromatic hydrophobic segments that adhere to the pigment surface. U.S. Pat. No. 5,085,698, the disclosure of which is incorporated herein by reference, teaches the use of AB or BAB block polymers as pigment dispersants for aqueous ink jet inks. While both the random and block polymer dispersants offer improved stability for the dispersed pigment, further improvements are desired for more advanced high quality coating applications.

Accordingly, the need exists for dispersants which will provide improved dispersion stability, flexibility for adjusting to a changing environment and which provide dispersions with improved coating quality.

SUMMARY OF THE INVENTION

One aspect of the invention is to provide an aqueous dispersion having improved stability comprising:

(a) an aqueous carrier medium;

(b) a particulate solid; and (c) an ABC triblock polymer comprising an A block which is a hydrophilic polymer, a B block which is a polymer capable of binding to the particulate solid, a C block different from the A and the B block, which is a hydrophobic or hydrophilic polymer; and wherein the A and C blocks are end blocks.

The invention provides stable aqueous dispersions comprising solids, in particular pigments, having broad compatibility in systems containing water miscible organic cosolvents, aqueous additives such as thickeners, latex emulsions, etc. Further, when these dispersions are used as aqueous ink jet ink compositions, they have shown to be extremely flexible and able to adjust to system changes such as drying of the coating or the firing conditions and exhibit good resistance to flocculation and develop high color strength and gloss.

DETAILED DESCRIPTION OF THE INVENTION

The dispersions of this invention have improved stability. They are particularly well suited for use as aqueous ink jet ink compositions for ink jet printers in general, and thermal ink jet printers in particular. The ink jet ink composition encompasses pigment-based colorant inks.

The inks may be adapted to the requirements of a particular ink jet printer to provide a balance of light stability, smear resistance, viscosity, surface tension, optical density, and crust resistance.

AQUEOUS CARRIER MEDIUM

The aqueous carrier medium is water or a mixture of water and at least one water soluble organic component. Deionized water is commonly used. The organic component may comprise organic solvents, polymeric binders, thickeners, thixotropic agents, coating aids, etc.

For ink jet inks the aqueous carrier medium is typically a mixture of water and at least one water-soluble organic solvent. Representative examples of water-soluble organic solvents are disclosed in U.S. Pat. No. 5,085,698, the disclosure of which is incorporated herein by reference. Selection of a suitable mixture of water and water soluble organic solvent depends upon requirements of the specific application, such as desired surface tension and viscosity, the selected pigment, drying time of the pigmented coating or ink jet ink, and the type of media substrate onto which the coating or ink will be printed. A mixture of diethylene glycol and deionized water is preferred as the aqueous carrier medium for ink jet inks, with the composition comprising between 30% and 95%, preferably 60% to 95% water, by weight based on the total weight of the aqueous carrier medium.

PARTICULATE SOLIDS

The particulate solids useful in the present invention may be a pigment, colloidal silver halide, metallic flake, a herbicide, an insecticide, or biomaterials such as drugs, etc. depending upon the particular application of the dispersions of this invention. For example, if the intended use is in an ink or a paint, the particulate solid is a pigment or a mixture of two or more pigments. The term "pigment" as used herein means an insoluble colorant.

The particular particulate solid selected must be capable of binding with the B block of the ABC triblock polymer. In other words, the particulate solid must have "binding sites" which will permit binding with the polymer. Most of the above-mentioned particulate solids have very specific functional groups on their surfaces.

For example, in the case of pigments, all carbon blacks have chemisorbed oxygenated complexes, primarily acidic in nature (e.g. carboxylic, quinonic, lactonic or phenolic groups) on their surfaces to varying degrees depending on the conditions of manufacture. These acidic groups on the pigment surface provide binding sites for dispersants with basic functions such as amines. Other pigments with acidic or basic functional groups on their surface, or which can by modified to contain such groups, are also known. Furthermore, almost all of the organic color pigments and many of the surface treatment compounds have aromatic features in their structures, providing sites for additional aromatic interactions with the dispersant. Examples of pigments which may be used to advantage include azo, anthraquinone, thioindigo, oxazine, quinacridone, lakes and toners of acidic dye stuffs or basic dye stuffs, copper phthalocyanine and its derivatives, and various mixtures and modifications thereof.

The particle size has an influence on the dispersion stability. Brownian motion of minute particles will help prevent the particles from flocculation and settling. The particular particle size should thus be selected to optimize the stability of the dispersion, consistent with the other requirements of the particular intended application of the dispersion.

For example, in ink jet inks, the pigment particles need to be sufficiently small to permit free flow of the ink through the ink jet printing device, especially at the ejecting nozzles that usually have diameter ranging from 10 micron to 50 micron. In addition, it is also desirable to use small particles for maximum color strength and gloss. For ink jet inks, the range of useful particle size is approximately 0.005 micron to 15 micron, and preferably between 0.01 to 5 microns, more preferably from 0.01 to 1 micron.

Also in the case of pigments, the selected pigment may be used in dry or wet form. For example, pigments are usually manufactured in aqueous media and the resulting pigment is obtained as water wet presscake. In presscake form, the pigment is not aggregated to the extent that it is in dry form. Thus, pigments in water wet presscake form do not require as much deaggregation in the process of preparing the inks from dry pigments. Representative commercial dry and presscake pigments that may be used in practicing the invention are disclosed in the aforementioned U.S. Pat. No. 5,085,698, which is incorporated herein by reference.

Fine particles of metal or metal oxides (such as copper, iron, steel, aluminum, silica, alumina, titania, and the like) also may be used to practice the invention and may find application in the preparation of magnetic ink jet inks.

ABC TRIBLOCK POLYMERS

The ABC triblock polymer comprises an A block which is a hydrophilic polymer, a B block which is a polymer capable of binding to the particulate solid, and a C block, different than the A or B block, which is a hydrophilic or hydrophobic polymer, and wherein the A & C blocks are end blocks.

A Block Polymers:

The function of the A block is to facilitate dispersion of the pigment in water. The A block is a hydrophilic, or water-soluble, polymer or copolymer. Some examples are poly(vinyl alcohol), acrylic homopolymers and copolymers and polyethylene oxide. Representative A block acrylic polymers are disclosed in U.S. Pat. No. 5,085,698 the disclosure of which is incorporated by reference. In that application, the hydrophilic polymer which serves to disperse the pigment in water comprises the B block, but would comprise the A block in the present polymer.

Nonionic acrylic A block monomers may be used, such as ethoxytriethyleneglycol-methacrylate. When the A block is an acrylic copolymer, the acid, amino, or water-soluble monomer may be used in a range of 10 to 100%, preferably in a range of 20 to 100% of the A block composition. Salts of these monomers are prepared by neutralizing with neutralizing agents. For example, with acid monomers the neutralizing agent may be selected from the group consisting of organic bases such as amines, alkanol amines, etc., and alkali metal hydroxides such as potassium hydroxide, sodium hydroxide, lithium hydroxide, etc. Amino monomers may be neutralized with organic or inorganic acids, such as acetic acid, propionic acid, p-toluene sulfonic acid, phosphoric acid, sulfuric acid, hydrochloric acid, nitric acid, etc. Amino monomers may also be quaternized with alkylating agents such as methyl iodide, benzyl chloride, methyl-p-toluene sulfonate, etc.

The A block generally will constitute 10 to 90%, preferably 25 to 65% of the entire block polymer by weight.

B Block Polymers:

The function of the B block, or center block, of the ABC triblock polymer dispersant is to bind the polymeric dispersant to the surface of the particulate solid, e.g., pigment particle. Strong interaction of a pigment with a polymeric dispersant is obtained when the dispersant has one or more attached structures which are the same as the particle. A common way that this may be accomplished is through general hydrophobic attraction between the B block of the polymer and the particle surface. For example, if the particle has, or is modified to contain a hydrophobic surface, a block polymer with a hydrophobic block can bind to such surface through hydrophobic interactions. Am example of a B block with good hydrophobic binding ability is poly(n-butyl methacrylate).

Alternatively, a block polymer can bind to a particulate solid through aromatic interactions. If the particle contains aromatic or aromatic-like groups, or if the particle surface has been pretreated with an aromatic substance, then aromatic groups in the B block of an ABC triblock dispersant may provide good binding to the particle. A block copolymer can also bind to a particulate solid through ionic bonds. For example, a particle containing acidic groups, e.g., sulfonic acid groups, can bind strongly to a block polymer in which one of the blocks contains basic groups, e.g., amine groups such as those derived from 2-N,N-dimethylaminoethyl methacrylate. Similarly, a particle containing basic groups, e.g., amine groups, can bind to a block polymer through acidic groups.

Covalent bonding provides a fourth, and especially strong, mode of binding a block polymer dispersant to a particulate solid. For example, a particle with carboxylic groups will react with a polymer which contains epoxy groups to form ester linkages. Thus, an ABC triblock polymer containing glycidyl methacrylate groups in the B block will form strong links to a carboxylic acid-containing particle.

Representative acrylic polymers which may be used to advantage as the B block of the present polymer are disclosed in the aforementioned U.S. Pat. No. 5,085,698 as the A block. Preferred B blocks are homopolymers and copolymers of benzyl methacrylate and/or 2-phenylethyl methacrylate.

C Block Polymers:

The function of the C Block is to provide stability of the dispersion in the presence of organic components which may be in the aqueous carrier medium. Organic components often contribute to flocculation of aqueous pigment dispersions. When the C block of an ABC triblock dispersant has good solubility in the organic components, resistance to flocculation can be markedly improved. The constituent monomer(s) of the C block may be hydrophilic or hydrophobic depending on the properties of the organic components, and they may include monomers which are constituents of the B block. Structural similarity between the C block and the organic component will generally result in good compatibility. Thus, n-butyl methacrylate and n-butoxyethyl methacrylate have good compatibility with butyl cellosolve or butyl carbitol; poly(ethoxytriethylene glycol methacrylate) has good compatibility with poly(ethylene oxide) as well as water because it is hydrophilic. Preferred monomers for the C block are butyl methacrylate and ethoxy triethylene glycol methacrylate. The C block may also function to improve polymer properties even in the absence of organic solvents.

It is particularly preferred for at least one of the blocks of the ABC triblock polymer to comprise monomers having oligoether moieties of the general formula

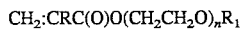

CH$_2$:CRC(O)O(CH$_2$CH$_2$O)$_n$R$_1$ where R=H, or methyl; R$_1$=alkyl of 1–4 carbon atoms or, phenyl; and n=1–20. Depending on the number, n, of oxyethylene units, the polymers can be just hydrophilic but water insoluble to completely water soluble. The solubility of the polymer increases as the number of oxyethylene units increases. These monomers can be advantageously used in any one of the blocks to adjust the physical properties, e.g., Tg, of the polymer dispersants of this invention while maintaining the compatibility with an aqueous dispersion system.

Some examples of these monomers include ethoxyethyl methacrylate, butoxyethyl methacrylate, ethoxy-triethylene methacrylate and methoxypolyethylene glycol methacrylate. Monomers of this formula can also be advantageously used in other types of polymers such as random polymers, AB block polymers, BAB triblock polymers, branched polymers, and graft polymers.

The ABC triblock polymers that are selected to advantage in practicing the present invention have an average number molecular weight below 20,000, preferably below 15,000, and typically in the range of 1,000–7,500. Particularly preferred acrylic ABC triblock polymers are disclosed in Assignee's copending application U.S. application Ser. No. 07/838,165 filed Feb. 20, 1992, now U.S. Pat. No. 5,219, 945, the disclosure of which is incorporated herein by reference.

Methods For Synthesis Of ABC Triblock Polymers:

Well defined ABC triblock polymers, in which the chemical constitution of each polymeric block differs from the other two, can be readily synthesized with many of the new methodologies for performing "living" polymerizations. Thus, binary and ternary block copolymers, based on esters, epoxides, and lactones, can be synthesized using novel metalloporphyrin initiators as described by Aida et al. in *Macromolecules,* 1985, 18, 1049, and Kuroki et al. in *J. Am. Chem. Soc.,* 1991, 113, 5903. Anionic polymerization of vinyl monomers permits the synthesis of block copolymers of hydrocarbons as well as acrylics as described by Morton in "Anionic Polymerization: Principles and Practice" Academic Press, NY, 1983. Cationic polymerization of oxazolines as disclosed by Kobayashi et al. in *Macromolecules,* 1987, 20, 1729 and references cited therein, lactones as disclosed by Jonte et al. in *J. Macromol. Sci. Chem.,* 1986, A23, 495, and alkyl vinyl ethers as disclosed by Aoshima et al. in *Macromolecules,* 1985, provide additional ways of preparing block polymers. Group transfer polymerization of acrylic monomers as disclosed by Webster in U.S. Pat. No. 4,417,034, 1983, and aldol group transfer polymerization of silyl enol ethers as disclosed by Sogah et al. in *Macromolecules,* 1986, 19, 1775, are particularly useful methods of producing block polymers.

Using one of the living polymerization methods, ABC block polymers are prepared by sequential addition of three monomers, or groups of monomers, to a suitable initiator.

An alternative approach is to prepare a living AB diblock polymer followed by reaction of the living end with that of a complimentary living polymer. For example, in the presence of an anion catalyst, the aldehyde end group of a poly(trialkylsilyl vinyl ether) will condense with the silyl ketene acetal end group of a living AB diblock copolymer of alkyl methacrylates prepared by group transfer polymerization to give an ABC triblock polymer. Hydrolysis of the trialkylsilyl ether groups of that end block will then convert that block to a hydrophilic poly(vinyl alcohol) block.

Another alternative approach is to prepare a terminal-functional AB diblock polymer using a functional initiator (or terminator) for a living polymerization. A complimentary terminal-functional polymer can then be reacted with the end group of the AB block copolymer to give an ABC triblock polymer.

Thus, the types of monomers that may be incorporated into the ABC triblock polymers are methacrylates, acrylates, vinylaromatics, diene hydrocarbons, lactones, lactams, oxazolines, epoxides, oxetanes, thioepoxides, alkyl vinyl ethers, and trialkylsilyl vinyl ethers. For simplicity and convenience, the synthesis of ABC triblock polymers by sequential addition of monomers (or groups of monomers)

in a living polymerization process is preferred. Group transfer polymerization of methacrylate monomers is the most preferred method.

OTHER INGREDIENTS

Depending on the requirements for the application, various types of aqueous additives can be used to modify the properties of the dispersion, as known to those skilled in the art. Examples include organic cosolvents, coalescing agents, polymeric binders including the water soluble polymers and the water dispersible latex emulsions, thickeners, thixotropic agents, surfactants, coating aids, biocides, sequestering agents, etc.

For ink jet ink applications of the present dispersions, anionic, cationic, nonionic, or amphoteric surfactants may be present in the amount of 0.01–5% and preferably 0.2–2%, based on the total weight of the ink. Biocides such as Dowicides® (Dow Chemical, Midland, MI), Nuosept® (Huls America, Inc., Piscataway, NJ), Omidines® (Olin Corp., Cheshire, CT), Nopcocides® (Henkel Corp., Ambler, PA), Troysans® (Troy Chemical Corp., Newark, NJ) and sodium benzoate; sequestering agents such as EDTA; and other known additives, such as humectants, viscosity modifiers and other acrylic or non-acrylic polymers may also be added to improve various properties of the ink compositions.

In a preferred embodiment, the present dispersions are employed as pigment dispersions for aqueous ink jet ink compositions which may be prepared in any of the conventional methods as known to those skilled in the art. The preferred formulation in an ink jet ink compositions is (a) aqueous carrier medium: approximately 70 to 99.8%, preferably approximately 94 to 99.8%, based on total weight of the ink when an organic pigment is selected; approximately 25 to 99.8%, preferably approximately 70 to 99.8% when an inorganic pigment is selected;

(b) pigments: up to approximately 30% pigment by weight for organic pigments, but generally in the range of approximately 0.1 to 15%, preferably approximately 0.1 to 8%, by weight of the total ink composition; with inorganic pigments (which have higher specific gravities), higher concentrations are employed, and may be as high as 75% in some cases.

(c) ABC triblock polymer: approximately 0.1 to 30% by weight of the total ink composition, preferably in the range of approximately 0.1% to 8% by weight of the total ink composition.

Jet velocity, separation length of the droplets, drop size, and stream stability are greatly affected by the surface tension and the viscosity of the ink. Pigmented ink jet inks suitable for use with ink jet printing systems should have a surface tension in the range of about 20 dyne/cm to about 70 dyne/cm and, more preferably, in the range 30 dyne/cm to about 70 dyne/cm at 20° C. Acceptable viscosities are no greater than 20 cP, and preferably in the range of about 1.0 cP to about 10.0 cP at 20° C.

INDUSTRIAL APPLICABILITY

The ABC triblock polymers of the invention may be designed to provide excellent dispersing power for organic and inorganic solids in aqueous media, or mixed aqueous-organic media. The dispersions with improved properties are particularly useful for coating applications such as paints and color films for imaging applications. They are also very useful for various types of inks, in particular, ink jet inks.

The following examples further illustrate but do not limit the invention.

EXAMPLES

Preparation 1 (Control):

Poly(methacrylic acid [48 mol %]-co-2-phenylethyl methacrylate [37 mol %]-co-ethoxytriethylene glycol methacrylate [15 mol %]); MAA/PEMA/ETEGMA (13/10/4)

To a solution of 2.00 g (11.49 mmol) of 1-methoxy-1-trimethylsiloxy-2-methyl-1-propene and 2.3 mL of tetrabutylammonium biacetate (0.1 M in propylene carbonate) in 50 mL THF was added dropwise 23.79 g (150.56 mmol) of trimethylsilyl methacrylate, 26.1 g (117.57 mmol) 2-phenylethyl methacrylate (purified by passage over a column of basic alumina) and 12.2 g (48.8 mmol) ethoxytriethylene glycol methacrylate (stored over 4 Å sieves for 7 days). During the course of the addition, the temperature rose to 64.4° C.

After stirring at room temperature, under nitrogen blanket, for 24 hours, 25 g methanol was added to the reaction mixture and it was refluxed for 16 hours to remove the trimethylsilyl protecting group from the methacrylic acid. Prior to addition of methanol, an aliquot of the reaction mixture was analyzed by $^1$H NMR, which indicated no unreacted monomers were present.

The poly(methacrylic acid [48 mol %]-co-2-phenylethyl methacrylate [37 mol %]-co-ethoxytriethylene glycol methacrylate [15 mol %]) was isolated via precipitation from hexane, then dried 24 hours in a 50° C. vacuum oven to give 41.9 g of product. $^1$H NMR analysis indicated the complete removal of the trimethylsilyl protecting group.

The polymer was neutralized with potassium hydroxide by mixing 20 g of the random polymer with 6.8 g of the potassium hydroxide (45.6% in deionized water) and 173.2 g of deionized water until a homogeneous 10% polymer solution was obtained.

Preparation 2: Poly(methacrylic acid [48 mol %]-b-2-phenylethyl methacrylate [37 mol % ]-b-ethoxytriethylene glycol methacrylate [15 mol %]); MAA//PEMA//ETEGMA (13//10//4)

To a solution of 22.6 g (26.2 mL, 130 mmol) of 1-methoxy-1-trimethylsiloxy-2-methyl-1-propene and 0.1 mL of tetrabutylammonium biacetate (0.1 M in propylene carbonate) in 300 mL of THF was added dropwise 268 g (304 mL, 1.69 mole) of trimethylsilyl methacrylate. During the course of the addition the temperature of the reaction mixture rose slowly to 50° C. To increase the rate of polymerization, an additional 1.5 mL of tetrabutylammonium biacetate (0.1 M in propylene carbonate) was added in 7 portions. After all of the monomer had been added, the temperature began to fall, and the solution was cooled with a bath to 30° C. The addition of 248 g (245 mL, 1.3 mole) of 2-phenylethyl methacrylate (purified by passage over a column of basic alumina under argon) was begun. An additional 0.6 mL of tetrabutylammonium biacetate (0.1 M in propylene carbonate) was added. During the addition the temperature rose 48° C. When the addition was complete and the temperature began to fall, the solution was cooled to 31° C., 0.15 mL of tetrabutylammonium biacetate (0.1 M in propylene carbonate) was added, and 128 g (128 mL, 0.52 mole) of ethoxytriethylene glycol methacrylate (purified by passage over a column of basic alumina under argon) was added dropwise from an addition funnel. Since little temperature change was observed, an additional 0.15 mL of tetrabutylammonium biacetate (0.1 M in propylene carbonate) was added to insure completion of the polymerization. Analysis of an aliquot of the solution by $^1$H NMR showed that there was no residual monomer present.

To the solution of poly(trimethylsilyl methacrylate [48 mol %]-b-2-phenylethyl methacrylate [37 mol %]-bethoxytriethylene glycol methacrylate [15 mol %]) was added 350 mL of 0.03 M tetrabutylammonium fluoride trihydrate in methanol. The resulting mixture was refluxed for 16 hr and evaporated in a rotary evaporator under reduced pressure. The residual polymer was dried for 48 hr in a vacuum oven to give 515 g of poly(methacrylic acid [48 mol %]-b-2-phenylethyl methacrylate [37 mol %]-b-ethoxytriethylene glycol methacrylate [15 mol %]). $^1$H NMR analysis of the product showed that no trimethylsilyl ester groups remained.

The block polymer was neutralized with potassium hydroxide by prewetting 100 g of the block polymer with 80 g of a mixture of tetrahydrofuran and isopropanol (3:2 by weight). The mixture was mixed with 32 g of potassium hydroxide (45.6% solution in deionized water) and 788 g of deionized water until a homogeneous 10% polymer solution was obtained.

Preparation 3:

Poly(methacrylic acid [48 mol %]-b-2phenylethyl methacrylate [30 mol %]-co-2-dimethylaminoethyl methacrylate [7 mol %]-b-ethoxytriethylene glycol methacrylate [15 mol %]); MAA//PEMA/DMAEMA//ETEGMA (13//10//4)

To a solution of 2.52 g (2.93 mL, 14.5 mmol) of 1-methoxy-1-trimethylsiloxy-2-methyl-1-propene and 0.5 mL of tetrabutylammonium biacetate (0.1 M in propylene carbonate) in 40 mL of THF was added dropwise 29.8 g (33.7 mL, 189 mmol) of trimethylsilyl methacrylate (purified by passage over a column of basic alumina under argon). During the course of the addition the temperature of the reaction mixture rose from 26° C. to 32° C. When 0.5 mL of additional catalyst solution was added, the temperature rose to 50° C. When the temperature had fallen to 36° C. the addition of a mixture of 22.0 g (21.8 mL, 116 mmol) of 2-phenylethyl methacrylate (purified by passage over a column of basic alumina under argon) and 4.6 g (4.9 mL, 29 mmol) of 2-dimethylaminoethyl methacrylate (purified by distillation) was begun. An additional 0.5 mL of catalyst solution was added, and the temperature slowly rose from 34° C. to 36° C. During 30 min, the temperature fell to 30° C. Then 14.5 g (14.5 mL, 58.2 mmol) of ethoxytriethylene glycol methacrylate (purified by passage over a column of basic alumina under argon) was added dropwise from an addition funnel. An additional 0.5 mL of catalyst solution was added, and during 40 min, the temperature rose to 32° C. and then fell to room temperature. Analysis of an aliquot of the solution by $^1$H NMR showed that there was no residual monomer present.

The solution of poly(trimethylsilyl methacrylate [48 mol %]-b-2-phenylethyl methacrylate [30 mol %]-co-2-dimethylaminoethyl methacrylate [7 mol %]-b-ethoxytriethylene glycol methacrylate [15 mol %]) was treated with 45 mL of 0.03 M methanolic tetrabutylammonium fluoride and heated at reflux for 8 hr. The solution was evaporated in a rotary evaporator under reduced pressure. The residual polymer was dried for 24 hr in a vacuum oven to give 59 g of poly(methacrylic acid [48 mol %]-b-2-phenylethyl methacrylate [30 mol %]-co-2-dimethylaminoethyl methacrylate [7 mol %]-b-ethoxytriethylene glycol methacrylate [15 mol %]). $^1$H NMR analysis of the product showed that no trimethylsilyl ester groups remained.

The block polymer was neutralized with potassium hydroxide by mixing 15 g of the block polymer with 4.9 g of potassium hydroxide (45.6% solution in deionized water) and 80.1 g of deionized water until a homogeneous 15% polymer solution was obtained.

Preparation 4: Preparation of poly(methacrylic acid [48 mol % ]-b-benzyl methacrylate [37 mol %]-b-ethoxytriethylene glycol methacrylate [15 mol %]); MAA//BzMA// ETEGMA (13//10//4)

To a solution of 9.05 g (10.5 mL, 51.9 mmol) of 1-methoxy-1-trimethylsiloxy-2-methyl-1-propene and 2 mL of tetrabutylammonium biacetate (0.1 M in propylene carbonate) in 150 mL of THF was added dropwise 107 g (121 mL, 0.677 mole) of trimethylsilyl methacrylate. During the course of the addition the temperature of the reaction mixture rose slowly and an additional 2 mL portion of tetrabutylammonium biacetate (0.1 M in propylene carbonate) was added. The temperature continued to rise to 57° C. after all of the monomer had been added. When the temperature fell to 33° C., the addition of a mixture of 91.6 g (88.6 mL, 0.52 mole) of benzyl methacrylate (purified by passage over a column of basic alumina under argon) was begun. An additional 1 mL of tetrabutylammonium biacetate (0.1 M in propylene carbonate) was added when the temperature leveled off at 39° C. As the addition of monomer was complete, the temperature rose to 57° C. When the temperature had decreased to 35° C., 51.2 g (51.2 mL, 0.205 mole) of ethoxytriethylene glycol methacrylate (purified by passage over a column of basic alumina under argon) was added dropwise from an addition funnel, and the mixture was stirred overnight. Analysis of an aliquot of the solution by $^1$H NMR showed that there was no residual monomer present.

The solution of poly(trimethylsilyl methacrylate [48 mol %]-b-benzyl methacrylate [37 mol %]-b-ethoxytriethylene glycol methacrylate [15 mol % ]) was refluxed for 12 hr with 150 mL of 0.03 M methanolic tetrabutylammonium fluoride and an additional 100 mL of THF. After evaporation in a rotary evaporator under reduced pressure, the residual polymer was dried for 48 hr in a vacuum oven at 50° C. to give 186.3 g of poly(methacrylic acid [48 mol %]-b-benzyl methacrylate [37 mol %]-b-ethoxytriethylene glycol methacrylate [15 mol %]). $^1$H NMR analysis of the product showed that no trimethylsilyl ester groups remained.

The block polymer was neutralized with potassium hydroxide by mixing 20 g of the block polymer with 7 g of potassium hydroxide (45.6% solution in deionized water) and 173 g of deionized water until a homogeneous 10% polymer solution was obtained.

Preparation 5: Poly(methacrylic acid [48 mol %]-b-2phenylethyl methacrylate [37 mol %]-b-methoxypolyethylene glycol 400 methacrylate [15 mol %]); MAA//PEMA// PEG400 MA (13//10//4)

To a solution of 1.72 g (9.9 mmol) of 1-methoxy-1-trimethylsiloxy-2-methyl-1-propene and 2.0 mL of tetrabutylammonium biacetate (0.1 M in propylene carbonate) in 48.2 mL of THF was added a mixture of 20.79 g of trimethylsilyl methacrylate and 50 mL of bis (dimethylamino)methylsilane (which had been allowed to stand for 60 min before beginning addition). After addition of the monomer, the temperature of the reaction mixture gradually rose from 25° C. to 34° C. during 40 min, and then fell to 28° C. during 15 min, whereupon a mixture of 21.3 g of 2-phenylethyl methacrylate and 50 mL of bis(dimethylamino)methylsilane (which had been allowed to stand for 60 min before beginning addition) was added during 5 min. The temperature of the reaction mixture rose to 38° C. and 1 mL of tetrabutylammonium biacetate (0.1 M in propylene carbonate) was added. The temperature reached a maximum of 40° C. 18 min after monomer addition was begun, and then fell to 31° C. during 45 min, whereupon a mixture of 18 g of methoxypolyethylene glycol 400 methacrylate (Polysciences, Inc., Warrington, PA) and 500 mL of bis(dimethylamino)methylsilane (which had been allowed to stand for 60 min before beginning addition) was added during 10 min. An additional 1.0 mL of tetrabutylammonium biacetate (0.1 M in propylene carbonate) was added. After 18 min and a 2° C. rise in temperature, 2.0 mL of tetrabutylammonium biacetate (0.1 M in propylene carbonate) was added, and the mixture was stirred overnight and then quenched with 5 molar equivalents (on initiator) of methanol. NMR analysis of an aliquot showed that there was no residual monomer in the solution of poly(trimethylsilyl methacrylate [48 mol %]-b-2-phenylethyl methacrylate [37 mol %]-b-methoxypolyethylene glycol 400 methacrylate [15 mol %]). After addition of 27 mL of tetrabutylammonium fluoride trihydrate (0.03 M in methanol), the reaction mixture was stirred at reflux for 8 hr. The solvent was removed under reduced pressure, and the residue was dried in a vacuum oven at 30° C. to give a quantitative yield of poly(methacrylic acid [48 mol %]-b-2-phenylethyl methacrylate [37 mol %]-b-methoxypolyethylene glycol 400 methacrylate [15 mol %]) .

The block polymer was neutralized with potassium hydroxide by mixing 20 g of the block polymer with 5.5 g of potassium hydroxide (45.6% solution in deionized water) and 174.5 g of deionized water until a homogeneous 10% polymer solution was obtained.

Preparation 6: Poly (methacrylic acid [46.8 tool% ]-co-ethoxytriethylene glycol methacrylate [14.4 mol % ]-b-2-phenylethyl methacrylate [38.8 mol %]); MAA/ETEGMA//PEMA (13/4//10)

To a solution of 2.53 g (2.93 mL, 14.5 mmol) of 1-methoxy-1-trimethylsiloxy-2-methyl-1-propene and 0.5 mL of tetrabutylammonium biacetate (0.1 M in propylene carbonate) in 40 mL of THF was added dropwise a mixture of 29.8 g (33.7 mL, 0.189 mole) of trimethylsilyl methacrylate and 14.5 g (14.5 mL, 0.0582 mole) of ethoxytriethylene glycol methacrylate. The temperature of the reaction mixture rose from 26° C. to 40° C. After addition of an additional 0.5 mL of tetrabutylammonium biacetate (0.1 M in propylene carbonate), the temperature rose to 57° C. When the temperature had fallen to 29° C., 0.3 mL of tetrabutylammonium biacetate (0.1 M in propylene carbonate) was added, followed by 29.9 g (29.6 mL, 0. 157 mole) of 2-phenylethyl methacrylate. The temperature rose to 48° C., and the mixture was stirred overnight. NMR analysis of an aliquot of the reaction mixture showed that there was no residual monomer in the solution of poly(trimethylsilyl methacrylate [46.8 mol %]-co-ethoxytriethylene glycol methacrylate [14.4 mol %]-b-2-phenylethyl methacrylate [38.8 mol %]). The solution was treated with 45 mL of tetrabutylammonium fluoride (0.03 M in methanol) and stirred at reflux for 8 hr. Evaporation under reduced pressure followed by drying in a vacuum oven gave 66.5 g of poly(methacrylic acid [46.8 mol %]-co-ethoxytriethylene glycol methacrylate [14.4 mol %]-b-2-phenylethyl methacrylate [38.8 mol %]).

The block polymer was neutralized with potassium hydroxide by mixing 20 g of the block polymer with 6.8 g of potassium hydroxide (45.6% solution in deionized water) and 173.2 g of deionized water until a homogeneous 10% polymer solution was obtained.

Preparation 7: Poly(dimethylaminoethyl methacrylate [28.3 mol %]-co-methyl methacrylate [18.8 mol %]-b-2-phenylethyl methacrylate [37.8 mol %]-b-ethoxytriethylene glycol methacrylate [15.1 mol %]), DMAEMA/MMA//PEMA//ETEGMA (7.5/5//10//4)

To a solution of 15.7 g (18.2 mL, 90.2 mmol) of 1-methoxy-1-trimethylsiloxy-2-methyl-1-propene and 0.3 mL of tetrabutylammonium biacetate (0.1 M in propylene carbonate) in 400 mL of THF was added dropwise a mixture of 106 g (114 mL, 677 mmol) of dimethylaminoethyl methacrylate (purified by passage over a column of basic alumina under argon) and 45 g (48.1 mL, 450 mmol) of methyl methacrylate (purified by passage over a column of basic alumina under argon). After all of the monomer had been added and the temperature began to fall the addition of 172 g (170 mL, 903 mmol) of 2-phenylethyl methacrylate (purified by passage over a column of basic alumina under argon) was begun. When the addition was complete and the temperature began to fall, 88.7 g (88.7 mL, 360 mmol) of ethoxytriethylene glycol methacrylate (purified by passage over a column of basic alumina under argon) was added dropwise from an addition funnel. Analysis of an aliquot of the solution by $^1$H NMR showed that there was no residual monomer present. The solution was evaporated in vacuo to give 456 g of poly(dimethylaminoethyl methacrylate [28.3 mol %]-co-methyl methacrylate [18.8 mol %]-b-2-phenylethyl methacrylate [37.8 mol %]-b-ethoxytriethylene glycol methacrylate [15.1 mol %]). GPC: Mn=6240, Mw=7770, Mw/Mn=1.24.

The block polymer was neutralized with phosphoric acid by prewetting 50 g of the block polymer with 50 g of a mixture of tetrahydrofuran and isopropanol (3:2 by weight) and then mixed with 13.5 g of phosphoric acid (47.5% solution in deionized water) and 219.8 g of deionized water until a homogeneous 15% polymer solution was obtained.

Control 1: Preparation of pigment dispersion using random polymer MAA/PEMA/ETEGMA (13/10/4)

A black pigment dispersion was prepared using the following procedure:

| Ingredient | Amount (parts by weight) |
| --- | --- |
| FW18, Carbon black pigment (Degussa Corp., Allendale, NJ) | 40 |
| Polymer obtained in Preparation 1, (10% solution) | 200 |
| Deionized water | 160 |

The above mentioned components were premixed in a plastic beaker by mechanical stirring until no lumps or dry clumps were visible. The mixture was dispersed in a microfluidizer (Microfluidics Corp., Watham, MA) by passing it through the interaction chamber 5 times under a liquid pressure of about 10,000 psi. The resulting pigment dispersion had 10% pigment concentration with an average particle size of 111 nm as determined by Brookhaven BI-90 particle sizer. The dispersion was filtered through a 1 micron high efficiency filter bag (3 M Filtration Products, St. Paul, MN). The final pH was 8.26.

Example 1: Preparation of pigment dispersion using ABC triblock polymer MAA//PEMA//ETEGMA (13//10//4)

A black dispersion was prepared using the following procedure:

| Ingredient | Amount (parts by weight) |
| --- | --- |
| FW18, Carbon black pigment (Degussa Corp., Allendale, NJ) | 200 |
| Polymer obtained in Preparation 2, | 1,000 |
| Deionized water | 800 |

The above mentioned components were premixed and dispersed, and filtered as described in Control 1 to give a 10% pigment concentrate, having an average particle size of 114 nm as determined by Brookhaven BI-90 particle sizer. The final pH was 7.57.

Example 2: Preparation of pigment dispersion using ABC triblock polymer MAA//PEMA/DMAEMA//ETEGMA (13//8/2//4)

A black dispersion was prepared using the following procedure:

| Ingredient | Amount (parts by weight) |
| --- | --- |
| FW200, Carbon black pigment (Degussa Corp., Allendale, NJ) | 30 |
| Polymer obtained in Preparation 3, | 100 |
| Deionized water | 70 |

The above mentioned components were premixed in a plastic beaker and mechanically stirred for 3 hours. 1.0 g of KOH (45.6% solution) was added to adjust the pH and the mixture was stirred overnight. Another 1.0 g of KOH (45.6% solution) was added and the mixture was dispersed and filtered as described in Control 1 to give dispersed and filtered as described in Control 1 to give a 10% pigment concentrate, having an average particle size of 106 nm as determined by Brookhaven BI-90 particle sizer. The final pH was 7.37.

Example 3: Preparation of pigment dispersion using ABC triblock polymer MAA//BzMA//ETEGMA (13//10//4)

A black dispersion was prepared using the following procedure:

| Ingredient | Amount (parts by weight) |
| --- | --- |
| FW18, Carbon black pigment (Degussa Corp., Allendale, NJ) | 40 |
| Polymer obtained in Preparation 4, | 200 |
| Deionized water | 160 |

The above mentioned components were premixed, dispersed, and filtered as described in Control 1 to give a 10% pigment concentrate, having an average particle size of 118 nm as determined by Brookhaven BI-90 particle sizer. The final pH was 7.35.

Example 4: Preparation of pigment dispersion using ABC triblock polymer MAA//PEMA//PEG400 MA (13//10//4)

A black dispersion was prepared using the following procedure:

| Ingredient | Amount (parts by weight) |
| --- | --- |
| FW18, Carbon black pigment (Degussa Corp., Allendale, NJ) | 40 |
| Polymer obtained in Preparation 5, | 200 |
| Deionized water | 160 |

The above mentioned components were premixed, dispersed, and filtered as described in Control 1 to give a 10% pigment concentrate, having an average particle size of 116 nm as determined by Brookhaven BI-90 particle sizer. The final pH was 8.88.

Example 5: Preparation of pigment dispersion using AB diblock polymer MAA/ETEGMA (13/4//10))

A black dispersion was prepared using the following procedure:

| Ingredient | Amount (parts by weight) |
| --- | --- |
| FW18, Carbon black pigment (Degussa Corp., Allendale, NJ) | 40 |
| Polymer obtained in Preparation 6, | 200 |
| Deionized water | 160 |

The above mentioned components were premixed, dispersed, and filtered as described in Control 1 to give a 10% pigment concentrate, having an average particle size of 116 nm as determined by Brookhaven BI-90 particle sizer. The final pH was 7.93.

Example 6: Preparation of pigment dispersion using ABC triblock polymer DMAEMA/MMA//PEMA//ETEGMA (7.5/5//10//4)

A magenta dispersion was prepared using the following procedure:

| Ingredient | Amount (parts by weight) |
| --- | --- |
| Sunfast magenta 122 (Presscake, 52.7% pigment, Sun Chemical Corp., Cincinnati, Ohio) | 75.9 |
| Polymer obtained in Preparation 7 | 133.3 |
| Deionized water | 57.5 |

The above mentioned components were mixed and mechanically stirred for 3 hours. The mixture was dispersed by passing through a microfluidizer continuously for 30 minutes, and then diluted with deionized water to a 10% pigment concentrate and filtered as in Control 1. The dispersion had an average particle size of 148 nm as determined by Brookhaven BI-90 particle sizer. The final pH was 4.12.

Stability Test

Dispersion stability was determined by measuring the particle size change in delta nm (Brookhaven BI-90 particle sizer, Brookhaven Instrument Corp., Holtsville, NY) after the ink samples had been subjected to 4 temperature cycles, each consisting of 4 hours at −20° C. and 4 hours at 70° C. The pigment concentration of the samples was 5% of the total ink weight. The cosolvents were tested at 8% of the total liquid carrier medium. The surfactants were tested at 3% of the total liquid carrier medium. The results are shown in Table 1 below.

TABLE 1

| Cosolvent or Surfactant | Delta nm | | | | | |
|---|---|---|---|---|---|---|
| | C1 | E1 | E2 | E3 | E4 | E5 |
| Cosolvents: | | | | | | |
| Neopentyl glycol (2,2-dimethyl-1,2-propanediol) | 13 | 7 | 0 | 0 | 0 | 12 |
| 3,3-Dimethyl-1,2-butanediol | 50 | 15 | 0 | 9 | 3 | 10 |
| 1,2,4-Butanetriol | 2 | 13 | 9 | 18 | 2 | 5 |
| Dowanol ® TBH | F[1] | 42 | 10 | 27 | 100 | 15 |
| Butyl carbitol | F | 64 | 1 | 21 | 148 | 14 |
| Liponic ® EG-1 | 1 | 5 | 1 | 0 | 5 | 0 |
| N-Acetyl ethanolamine | 9 | 6 | 7 | 14 | 3 | 113 |
| 1-Ethyl-2-pyrrolidinone | 5 | 0 | 17 | 7 | 0 | 22 |
| 1,4-Cyclohexanedimethanol | 5 | 44 | 0 | 4 | 0 | 12 |
| Surfactants: | | | | | | |
| Merpol ® SH | 96 | 45 | 0 | 25 | 33 | 27 |
| Aerosol ® MA-80/Aerosol ® OT (⅔) | 64 | 26 | 0 | 23 | 23 | 18 |
| Surfynol ® CT-136 | 41 | 28 | 0 | 15 | 27 | 16 |
| Surfynol ® 465 | 47 | 32 | 0 | 10 | 4 | 12 |
| Triton ® X-100 | 50 | 25 | 30 | 31 | 18 | 7 |
| Synthrapol ® KB | 152 | 46 | 0 | 27 | 42 | 20 |

Neopentyl glycol, 3,3-dimethyl-1,2-butanediol, 1,2,4-butanetriol, butyl carbitol, N-acetyl ethanolamine, 1-ethyl-2-pyrrolidinone, 1,4-cyclohexanedimethanol were obtained from Aldrich Chemical Co., Milwaukee, WI.

Dowanol® TBH was obtained from Dow Chemical, Midland, MI.

Liponic® EG-1 was obtained from Lipo Chemicals Inc., Paterson, NJ.

Merpol® SH was obtained from E. I. Du Pont Co., Wilmington, DE.

Aerosol® MA-80 and OT were obtained from American Cyanamid Co., Wayne, NJ.

Surfynol® CT-136 and 465 were obtained from Air Products and Chemicals, Inc., Allentown, PA.

Triton® X-100 was obtained from Rohm & Haas Co., Philadelphia, PA.

Synthrapol® KB was obtained from ICI Americas, Inc., Wilmington, DE.

[1]F=Grossly flocculated

Since the C block of the polymer dispersant in Example 1 has a similar structure to Dowanol TBH and butyl carbitol, a dramatic improvement in stability was obtained over Control 1 in dispersions containing these cosolvents. In Example 2, the polymer dispersant has amine functions in the center B block to interact with the acidic surface of FW200 carbon black (pH=2.5). The dispersion exhibited much improved stability for all cosolvents and surfactants tested.

Print Test

Test #1: A black ink was formulated with the following composition:

| Ingredient | Amount (Part by Weight) |
|---|---|
| Pigment concentrate of Example 2 | 8.0 |
| Diethyleneglycol | 1.0 |
| Butyl carbitol | 1.0 |
| Deionized water | 10.0 |

The ink was filled into a thermal ink jet pen and printed with a Hewlett Packard DeskJet ink jet printer on Gilbert bond paper (25% cotton, Mead Co., Dayton, OH). It printed smoothly and the print had an optical density of 0.91 with ink penetrating through the paper very rapidly.

Test #2: A black ink was formulated with the following composition:

| Ingredient | Amount (Part by Weight) |
|---|---|
| Pigment concentrate of Example 1 | 8.0 |
| Liponic ® EG-1 | 1.5 |
| Triton ® X-100 | 0.2 |
| Deionized water | 10.3 |

The ink was filled into a thermal ink jet pen and printed with a Hewlett Packard DeskJet ink jet printer on Gilbert bond paper (25% cotton, Mead Co., Dayton, OH). It printed smoothly and the print had very sharp edges with an optical density of 1.27.

What is claimed is:

1. An aqueous dispersion comprising:
   (a) an aqueous carrier medium comprising water and at least one water soluble organic component;
   (b) a particulate solid having functional groups on the surface thereof; and
   (c) an ABC triblock polymer wherein
      (1) the A block is an end block and is a water soluble hydrophilic polymer,
      (2) the B block is a polymer having functional groups, and
      (3) the C block is an end block, different from the A block and the B block, and is a polymer which is soluble in the at least one water soluble organic component in the aqueous carrier medium;
   wherein the functional groups on the surface of the particulate solid are bound to the functional groups on the B block.

2. The aqueous dispersion of claim 1, wherein the bonding between the functional groups on the surface of the particulate solid and the functional groups on the B block is selected from the group consisting of hydrophobic attraction, aromatic interactions, ionic bonding and covalent bonding.

3. The dispersion of claim 1, wherein the particulate solid is a pigment and wherein said aqueous carrier medium comprises water and an organic solvent.

4. The dispersion of claim 1, wherein the A block is selected from the group consisting of poly(vinyl alcohol), acrylic homopolymer, acrylic copolymer, and polyethylene oxide.

5. The dispersion of claim 4, wherein the A block is an acrylic homopolymer or copolymer prepared from a water-soluble monomer.

6. The dispersion of claim 5, wherein the monomer is neutralized with a neutralizing agent.

7. The dispersion of claim 5, wherein the monomer is in the range of 10 to 100% by weight based on the total weight of the A block.

8. The dispersion of claim 1, wherein the content of the A block is approximately 10 to 90% by weight based on the total weight of the block polymer.

9. The dispersion of claim 1 or 2, wherein the B block is bound to the particulate solid through hydrophobic attractions.

10. The dispersion of claim 9, wherein the B block is poly(n-butyl methacrylate).

11. The dispersion of claim 1 or 3, wherein the B block is bound to the particulate solid through aromatic interactions.

12. The dispersion of claim 11, wherein the B block is a homopolymer or copolymer of benzyl methacrylate.

13. The dispersion of claim 11, wherein the B block is a homopolymer or copolymer of 2-phenylethyl methacrylate.

14. The dispersion of claim 1 or 3, wherein the B block is bound to the particulate solid through ionic bonds.

15. The dispersion of claim 14, wherein the B block comprises basic groups and wherein the particulate solid comprises acidic groups.

16. The dispersion of claim 1 or 3, wherein the B block is bound to the particulate solid through covalent bonding.

17. The dispersion of claim 1 or 3, wherein the C block is hydrophilic.

18. The dispersion of claim 1 or 3, wherein the C block is hydrophobic.

19. The dispersion of claim 1 or 3, wherein the C block is prepared from monomers selected from the group consisting of butyl methacrylate and ethoxytriethylene glycol methacrylate.

20. The dispersion of claim 1, wherein the ABC triblock is prepared from monomers selected from the group consisting of methacrylates, acrylates, vinylaromatics, diene hydrocarbons, lactones, lactams, oxazolines, epoxides, oxetanes, thioepoxides, alkyl vinyl ethers, and trialkylsilyl vinyl ethers.

21. The dispersion of claim 1 or 3, wherein the ABC triblock is prepared from monomers having oligoether moieties of the structure:

$$CH_2{:}CRC(O)O(CH_2CH_2O)_nR_1$$

where R=H or methyl; $R_1$=alkyl of 1 to 4 carbon atoms or phenyl; and n=1–20.

22. The dispersion of claim 21, wherein said monomers are selected from the group consisting of ethoxyethyl methacrylate, butoxyethyl methacrylate, ethoxytriethylene methacrylate and methoxypolyethylene glycol methacrylate.

23. The dispersion of claim 1 or 3, wherein the ABC triblock is methacrylic acid//phenylethyl methacrylate//ethoxytriethylene glycol methacrylate (13//10//4).

24. The dispersion of claim 1 or 3, wherein the ABC triblock is methacrylic acid//phenylethyl methacrylate/dimethylaminoethyl methacrylate//ethoxytriethylene glycol methacrylate(13//8/2//4).

25. The dispersion of claim 1 or 3, wherein the ABC triblock is dimethylaminoethyl methacrylate/methyl methacrylate//phenylethyl methacrylate//ethoxytriethylene glycol methacrylate(7.5//5//10//4).

26. The dispersion of claim 3, wherein the organic solvent is a water soluble organic solvent having at least one hydroxyl group.

27. The dispersion of claim 1 or 3, wherein the particulate solid has a size of approximately 0.01 to 5 microns.

* * * * *